United States Patent [19]
Sugano et al.

[11] Patent Number: 5,953,303
[45] Date of Patent: Sep. 14, 1999

[54] RECORDING AND/OR REPRODUCING APPARATUS WITH ELASTIC SUPPORTING MECHANISM FOR ARRANGING A HOUSING AT AN ANGLE OF INCLINATION BETWEEN A HORIZONTAL POSITION AND A VERTICAL POSITION

[75] Inventors: Yasunori Sugano; Masayasu Ito, both of Kanagawa; Sei Ohnishi, Saitama, all of Japan

[73] Assignee: Sony Corporation, Tokyo, Japan

[21] Appl. No.: 08/938,942

[22] Filed: Aug. 6, 1997

Related U.S. Application Data

[62] Division of application No. 08/650,799, May 20, 1996, Pat. No. 5,757,753.

[30] Foreign Application Priority Data

May 31, 1995 [JP] Japan ................................. P07-134594

[51] Int. Cl.⁶ .................................................. G11B 33/02
[52] U.S. Cl. ................................................................ 369/75.1
[58] Field of Search ..................................... 369/75.1, 247, 369/248, 263; 360/97.02; 206/521; 248/624, 625, 638

[56] References Cited

U.S. PATENT DOCUMENTS

| | | | |
|---|---|---|---|
| 4,098,513 | 7/1978 | Klapproth et al. | 369/263 |
| 4,794,588 | 12/1988 | Yoshitoshi et al. | 369/263 |
| 5,042,024 | 8/1991 | Kurosawa et al. | 369/75.1 |
| 5,364,059 | 11/1994 | Kinoshita et al. | 369/75.1 X |
| 5,410,533 | 4/1995 | Ohsaki et al. | 369/263 |
| 5,595,430 | 1/1997 | Weyeneth | 369/263 X |
| 5,663,943 | 9/1997 | Yanagisawa et al. | 369/75.1 |

*Primary Examiner*—William R. Korzuch
*Attorney, Agent, or Firm*—Jay H. Maioli

[57] ABSTRACT

A shock resistant recording and/or reproducing apparatus for disc recording media is disposed in a passenger compartment of an automobile at a predetermined angle of inclination. The recording and/or reproducing apparatus includes a housing, a recording and/or reproducing portion, and an elastic supporting mechanism. The housing is arranged at an angle of inclination between a horizontal state and a vertical state. The recording and/or reproducing portion is accomodated in the housing and performs recording and/or reproducing for recording media. The elastic supporting mechanism elastically supports the recording and/or reproducing portion so that the recording and/or reproducing portion can move by a predetermined distance relative to the housing.

5 Claims, 11 Drawing Sheets

RECORDING AND/OR REPRODUCING APPARATUS WITH ELASTIC SUPPORTING MECHANISM FOR ARRANGING A HOUSING AT AN ANGLE OF INCLINATION BETWEEN A HORIZONTAL POSITION AND A VERTICAL POSITION

This is a division of application Ser. No. 08/650,799 filed May 20, 1996, now U.S. Pat. No. 5,757,753 issued May 26, 1998.

BACKGROUND OF THE INVENTION

1. Field of the Invention

The present invention relates to a recording and/or reproducing apparatus for a recording medium, more particularly relates to a recording and/or reproducing apparatus for a recording medium in which a mechanical portion for performing the recording and/or reproduction of an information signal has a supporting mechanism which supports the recording and/or reproducing portion in a state where it is spaced away from an inner surface of a housing.

2. Description of the Prior Art

In general, as a recording medium of an information signal, a tape recording medium such as a magnetic tape, and a disc-like recording medium such as an optical disc, a magneto-optical disc, and a magnetic disc (hereinafter simply referred to as a "disc") have been used. There has been proposed a disc recording and/or reproducing apparatus for performing the recording or reproduction of the information signal with respect to such discs.

Among such disc recording and/or reproducing apparatuses, an automobile disc recording and/or reproducing apparatus configured so as to be installed and used in the passenger compartment of an automobile has been used. When an automobile disc recording and/or reproducing apparatus is installed and used in an automobile, if the vibration and shock accompanying with the driving of the automobile is applied to the disc drive portion serving as the recording and/or reproducing portion performing the recording and/or reproduction of the information signal with respect to the disc, the recording or reproduction of the disc cannot be performed well. When vibration and shock are applied during the recording or reproduction operation, a head device provided in the disc drive portion fluctuates in its position relative to the disc and becomes unable to correctly follow the track formed on the disc. When the tracking operation of the disc by the head device is interrupted, where the information signal is music, the interruption of the read out of the information signal from the disc or the scanning of another track by the head device causes a so-called "sound jump", that is, a discontinuity in what should be a continuous series of audio signals.

Therefore, the disc drive portion of an automobile disc recording and/or reproducing apparatus is supported by a supporting mechanism so that its parts have constant interval or distance from the inner surface of the outer housing. Namely, the disc drive portion is designed to be suspended by a plurality of springs to form the supporting mechanism from the outer housing in which the disc drive portion is accommodated. One end of each of these springs is engaged with an engagement portion of the disc drive portion, while the other end is engaged with an engagement portion provided on the inner surface of the outer housing. In this way, the disc drive portion is supported by the supporting mechanism spaced by a predetermined distance from the inner surface of the outer housing, whereby even if vibration and shock are applied while the automobile is being driven, the vibration and shock will be absorbed, so almost no vibration and shock will be transferred to the disc drive portion.

In a disc recording and/or reproducing apparatus configured in this way, when a low frequency vibration occurs or the outer housing is tilted, the disc drive portion will move inside the outer housing. If the disc drive portion moves in the inside of the outer housing in this way, the vibration and shock applied to the outer housing will not be sufficiently absorbed by the supporting mechanism, so the vibration and shock from the outside will be applied to the disc drive portion, and the disc drive portion may strike the inner surface of the outer housing. For this reason, the disc drive portion must be supported at the neutral position inside the outer housing. This "neutral position" is the position where the disc drive portion becomes equi-distant from the inner surface of the outer housing in all directions. By supporting the disc drive portion at the neutral position of the outer housing, as a result, no matter from what direction the vibration and shock are applied, the disc drive portion will not strike the inner surface of the outer housing.

Note that there are cases where the automobile recording and/or reproducing apparatus mentioned above has to be able to be used not only in a horizontal state, but also in a state where it is inclined or in a state where it is perpendicular according to the position in the passenger compartment of the automobile where it is installed. For example, considering this by using a case where a disc recording and/or reproducing apparatus is installed in a passenger car as an example, the outer housing of the apparatus can be horizontally installed when installed on the floor under the passenger seat or on the floor of the trunk. However, when installed under the dashboard or at the back of a seat back, the outer housing sometimes can be installed only in an inclined state or vertical state. Even when the apparatus is installed in the trunk, it is sometimes convenient to install the outer housing in a vertical state depending on the size of the trunk.

For this reason, in the automobile disc recording and/or reproducing apparatus mentioned before, the supporting mechanism for supporting the disc drive portion with respect to the outer housing is configured so that the springs to form the supporting mechanism can be reattached in accordance with the angle of inclination at the time of installation of the outer housing. Namely, the springs are reattached in a state where they are engaged with the engagement portions of the outer housing at positions above this disc drive portion so that when the disc drive portion is suspended from the top of the outer housing it is supported at the neutral position irrespective of the state of inclination of the outer housing.

As the supporting mechanism, there is one configured to enable the engagement portions of the outer housing to be continuously moved. In this supporting mechanism, the engagement portions are moved in accordance with the state of inclination at the time of installation of the outer housing so as to be located above the disc drive portion, whereby the springs form the supporting mechanism suspend the disc drive portion from the top of the outer housing in the same way as in the case mentioned above. As a result, the disc drive portion is supported at the neutral position.

In an automobile disc recording and/or reproducing apparatus which supports the disc drive portion by using the above-mentioned supporting mechanism, however, in order to enable the reattachment of the springs constituting this supporting mechanism, it is necessary to provide a plurality of engagement portions in the outer housing for each spring and further to provide an opening in the outer housing for performing the reattachment of the springs. For this reason, not only does the structure become complex, but also the apparatus itself becomes larger in size. Further, the manufacturing process such as the assembly and the like becomes complex. Furthermore, since an opening is provided in the outer housing, the outer appearance may be ruined.

Even in a case where the engagement portions are constituted so as to be able to be moved, the complexity and enlargement in size of the structure of the apparatus itself and further a greater complexity of manufacturing process are induced and, at the same time, the design of the outer housing is limited as well as the above-mentioned configuration.

As explained above, in a disc recording and/or reproducing apparatus requiring the reattachment of the springs to form the supporting mechanism or the movement of the engagement portions in accordance with the state of installation of the outer housing or the angle of inclination of the outer housing, the operation for reattachment of the springs or the operation for movement are troublesome and, accordingly, the user of the apparatus is forced to perform additional work. These operations are easily forgotten or mistakenly performed when the apparatus is first installed, or the position of installation is moved, etc. So the disc drive portion can no longer be supported at the neutral position, and accordingly it becomes impossible to guarantee stable recording and/or reproduction of the information signal.

Further, in the disc recording and/or reproducing apparatus mentioned above, when the angle of inclination changes during use, since it is not possible to reattach the springs or move the engagement portions at that time, it similarly becomes impossible to guarantee the stable recording and/or reproduction of the information signal.

SUMMARY OF THE INVENTION

It is therefore an object of the present invention to provide a recording and/or reproducing apparatus for a recording medium which solves the above-mentioned problem.

According to the present invention, there is provided a recording and/or reproducing apparatus having a housing, a recording and/or reproducing portion, and a supporting mechanism. The housing is arranged with an angle of inclination between a horizontal state and a vertical state. The recording and/or reproducing portion performs the recording and/or reproduction of the recording medium when accommodated in the housing. An elastic supporting mechanism supports the recording and/or reproducing portion so that the weight of the recording and/or reproducing portion and the elastic supporting force by the elastic supporting mechanism are balanced when the housing is arranged in the horizontal and vertical states, and supports the recording and/or reproducing portion so that the recording and/or reproducing portion is movable in all directions approximately equidistantly relative to the housing when the housing is arranged at an intermediate position between the horizontal state and the vertical state.

BRIEF DESCRIPTION OF THE DRAWINGS

These and other objects, features and advantages of the present invention will become more apparent from the following description when read in conjunction with the accompanying drawings, in which.

DETAILED DESCRIPTION OF THE PREFERRED EMBODIMENTS

Figure 1:
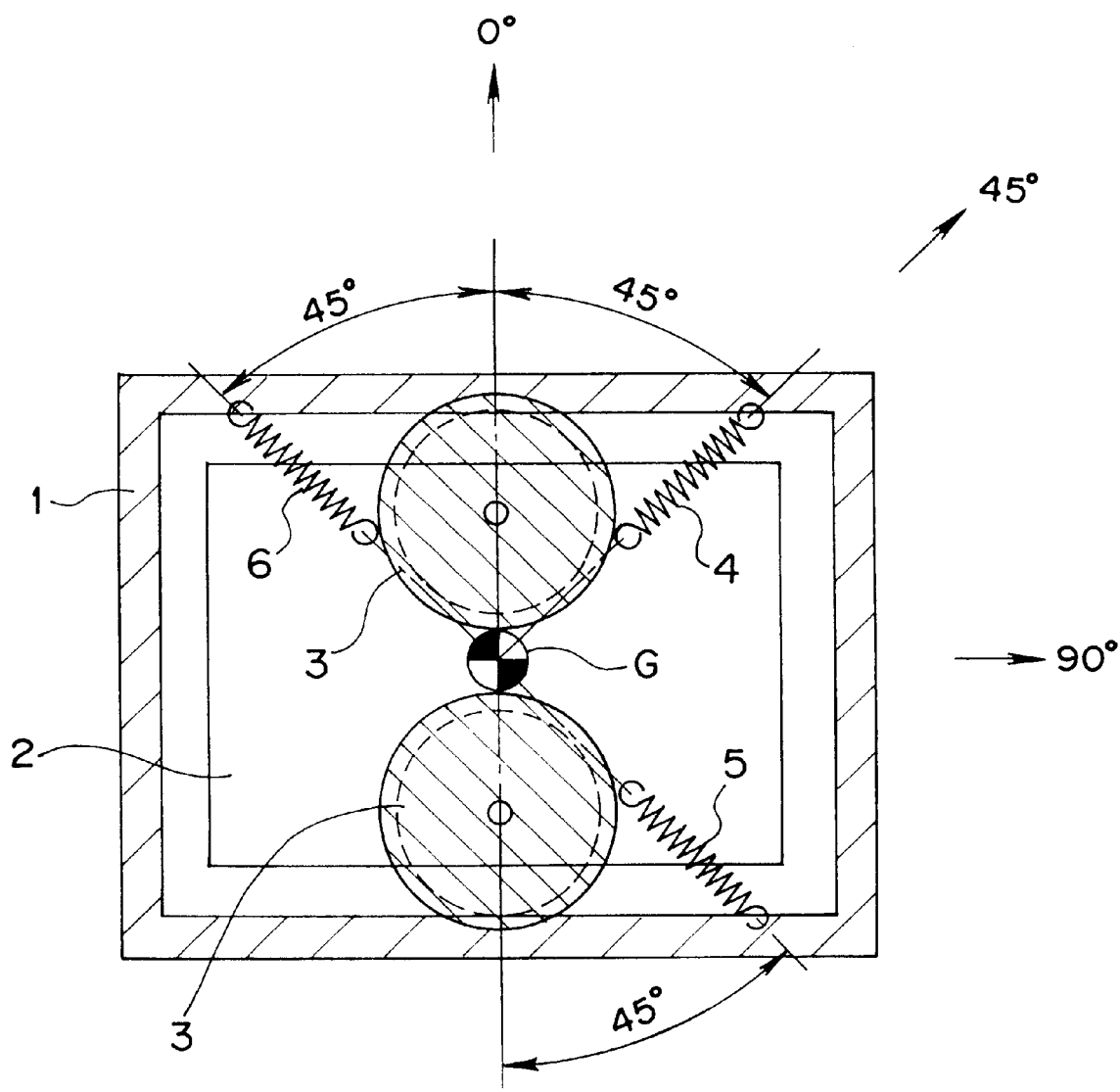
FIG. 1 is a side view of a disc player partially cut-away according to a first embodiment of the present invention.

Below, a recording and/or reproducing apparatus for a recording medium according to an embodiment of the present invention will be explained in detail by referring to the drawings.

In the following embodiments, the explanation will be made referring to an example where the present invention is applied to a recording and/or reproducing apparatus using a disc-like recording medium such as an optical disc or a magneto-optical disc (hereinafter referred to as a "disc") as the recording medium. Particularly, as the disc recording and/or reproducing apparatus, a disc player to be mounted and installed in the passenger compartment of an automobile will be illustrated.

As the disc to be used in the disc player of the present embodiment, there can be mentioned, for example, a read-only optical disc having a diameter of 120 mm, a read-only optical disc having a diameter of 80 mm, an optical disc having a diameter of 64 mm and accommodated in a cartridge, and a magneto-optical disc having a diameter of 64 mm and accommodated in a cartridge.

Here, the optical disc is composed of a reflection layer made of a metal such as aluminum and a recording layer made of a magneto-optical recording material or the like. The layer is coated on a transparent disc substrate. In the case of a read-only optical disc, the information signal is recorded by fine pits on the disc substrate surface. A magneto-optical disc is composed of a recording layer made of a magnetic material coated on a transparent disc substrate. The information signal is written by partially heating this recording layer and, at the same time, applying a vertical magnetic field modulated by the signal to be recorded. The information signal is read by irradiating a straight beam of polarized light such as a laser beam to this recording layer and detecting the change of the angle of polarization of the light reflected back from the optical disc.

First, the configuration of the disc player according to the first embodiment of the present invention will be explained by using FIG. 1. As shown in FIG. 1, this disc player is provided with a housing 1 to form the body of the apparatus and a recording and/or reproducing portion 2 accommodated in this housing 1.

A disc is mounted in the recording and/or reproducing portion 2 where an audio signal is written on it or read out from it. Namely, this recording and/or reproducing portion 2 is provided with a disc driving mechanism attached via a mounting plate disposed in the housing 1 and an optical pick-up device. The disc driving mechanism is provided with a disc table for holding the disc and a spindle motor for driving the rotation of this disc table and drives the disc held on the disc table to rotate at for example a constant linear speed. Further, the optical pick-up device irradiates a beam onto the disc rotated by the disc driving mechanism to perform the writing or read out of the information signal.

The housing 1 is made in a rectangular shape with completely closed sides and is installed on the floor, wall, etc. of the passenger compartment of the automobile by using mounting screws and other fittings.

Figure 2:
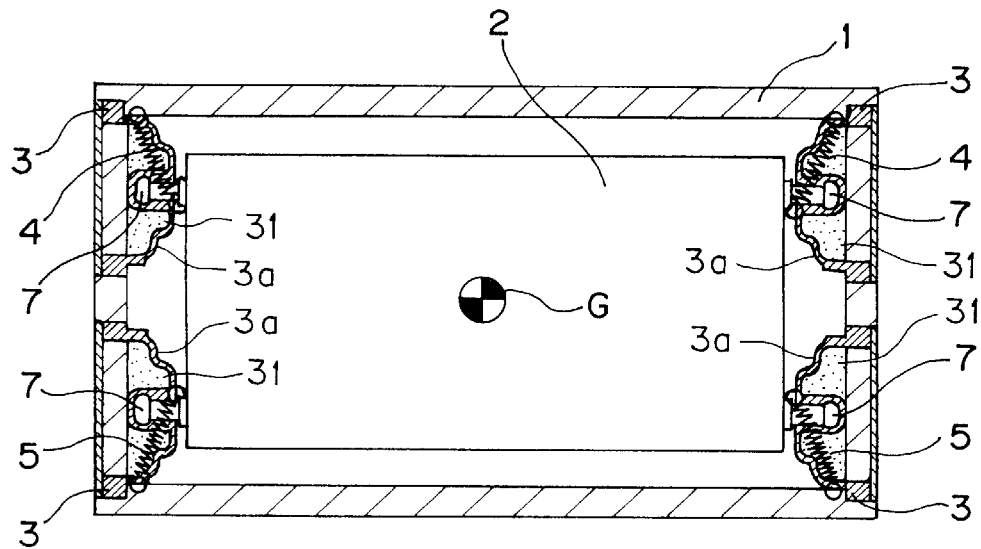
FIG. 2 is a front view of the above disc player partially cut-away.
Figure 3:
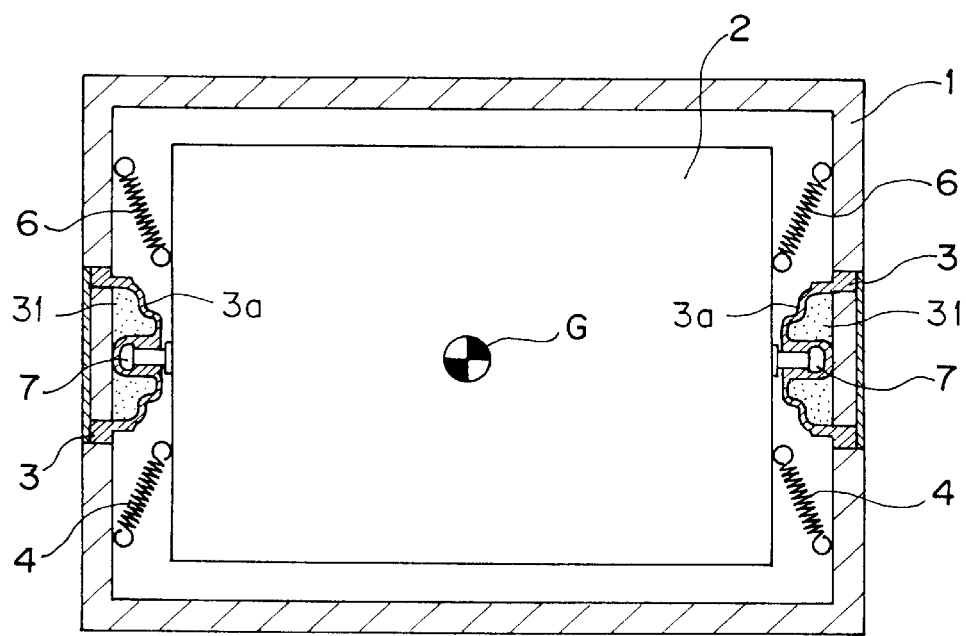
FIG. 3 is a top view of the above disc player partially cut-away.

The recording and/or reproducing portion 2 is accommodated in the housing 1 and is supported with respect to this inner surface of this housing 1 by a supporting mechanism having a plurality of springs 4, 5, and 6 so that it can move inside the housing 1 as will be explained later. One end of each of the springs 4, 5, and 6 to form this supporting mechanism is engaged with an engagement portion provided at the recording and/or reproducing portion 2, while the other end is engaged with an engagement portion provided on the inner surface of the housing 1. As a result, as shown in FIG. 1 through FIG. 3, the recording and/or reproducing portion 2 is supported so that a predetermined clearance or distance is formed from the inner surface of the housing 1 at its top and bottom and left and right sides. The "predetermined clearance or distance" referred to here is a sufficient clearance or distance with which the inner surface of the housing 1 and the recording and/or reproducing portion 2 will not abut against or strike each other when the recording and/or reproducing portion 2 moves inside the housing 1 by applying vibration and shock to the housing 1 caused by the movement of the automobile etc.

In this first embodiment, the supporting mechanism has first to third spring 4, 5, and 6 which are tensile coil springs. A pair of supporting mechanisms each are arranged between the inner surfaces of the housing 1 facing the two sides of the recording and/or reproducing portion 2 and the recording and/or reproducing portion 2 as shown in FIG. 2 and FIG. 3.

Further, a plurality of dampers 3 are arranged between the sides of the recording and/or reproducing portion 2 and the inner surface of the housing 1. These dampers 3 are attached to support shafts 7 projecting sideward from the recording and/or reproducing portion 2. These dampers 3 are provided with sealing members 3a which form a cap-like shape, are attached to the inner surface of the housing 1, and supported by the support shafts 7 and can be elastically displaced. These sealing members 3a are formed by a material having elasticity such as rubber and have sealed in them a liquid 31 having an appropriate viscoelasticity such as an oil or fat. These dampers 3 suppress the speed of movement of the recording and/or reproducing portion 2 with respect to the housing 1 and absorb and attenuate the vibration of the recording and/or reproducing portion 2 with respect to the housing 1.

In this disc player, the housing 1 is disposed in the passenger compartment by fitting so that the angle of inclination in the installed state becomes within the range of the usable angle about a not-illustrated horizontal pivot shaft.

In this first embodiment, the pivot shaft is a shaft extending to both sides of the disc player. Accordingly, the "inclination of the housing 1" is a state where the front surface is pivoted upward or downward from the horizontal state when the state where the front surface of this housing 1 faces forward vertically is defined as the horizontal direction. In the first embodiment, the range of usable angle is ±0° to +90° with respect to the horizontal direction. The state where the angle of inclination of the housing 1 is ±0° is a state where the front surface of the housing 1 faces forward. The state where the angle of inclination of the housing 1 is +90° is a state where the front surface of the housing 1 faces upward. The state where the angle of inclination of the housing 1 is +45° is a state where the front surface of the housing 1 faces upward at a slant.

Figure 4:
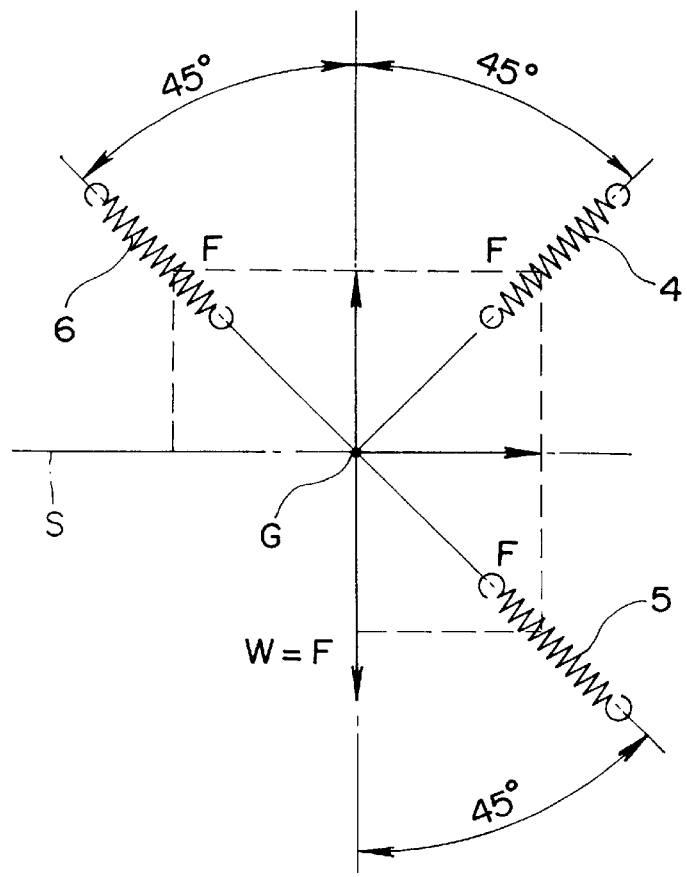
FIG. 4 is a side view of a supporting mechanism to form the above disc player.

As shown in FIG. 1 and FIG. 4, when the housing 1 is installed in a state where it faces the horizontal direction, the first spring 4 of the supporting mechanism is located in the plane vertical to the pivot shaft on a line passing through the horizontal virtual pivot shaft passing through a center of gravity G of the recording and/or reproducing portion 2 and is arranged at a position facing obliquely upward at +45°, as the angle from the horizontal plane S. The end of this first spring 4 located on the pivot shaft side is engaged with the engagement portion of the recording and/or reproducing portion 2, while the other end located on the side apart from the pivot shaft is engaged with the engagement portion of the housing 1. As a result, the first spring 4 is tensed between the recording and/or reproducing portion 2 and the housing 1.

As shown in FIG. 1 and FIG. 4, when the housing 1 is in a state facing the horizontal direction, the second spring 6 is located in the plane vertical to the pivot shaft on a line passing through this pivot shaft and is arranged at a position facing obliquely upward at +135° as the angle from the horizontal plane S. One end of this second spring 6 located on the pivot shaft side is engaged with the engagement portion of the recording and/or reproducing portion 2, while the other end located on the side away from the pivot shaft is engaged with the engagement portion of the housing 1. As a result, the second spring 6 is tensed between the recording and/or reproducing portion 2 and the housing 1.

As shown in FIG. 1 and FIG. 4, when the housing 1 is in a state facing the horizontal direction, the third spring 5 is located in the plane vertical to the pivot shaft on a line passing through this pivot shaft and is arranged at a position facing obliquely downward at −45° as the angle from the horizontal plane S. One end of this third spring 5 located on the pivot shaft side is engaged with the engagement portion of the recording and/or reproducing portion 2, while the other end located on the side apart from the pivot shaft is engaged with the engagement portion of the housing 1. As a result, the third spring 5 is tensed between the recording and/or reproducing portion 2 and the housing 1.

Figure 6:
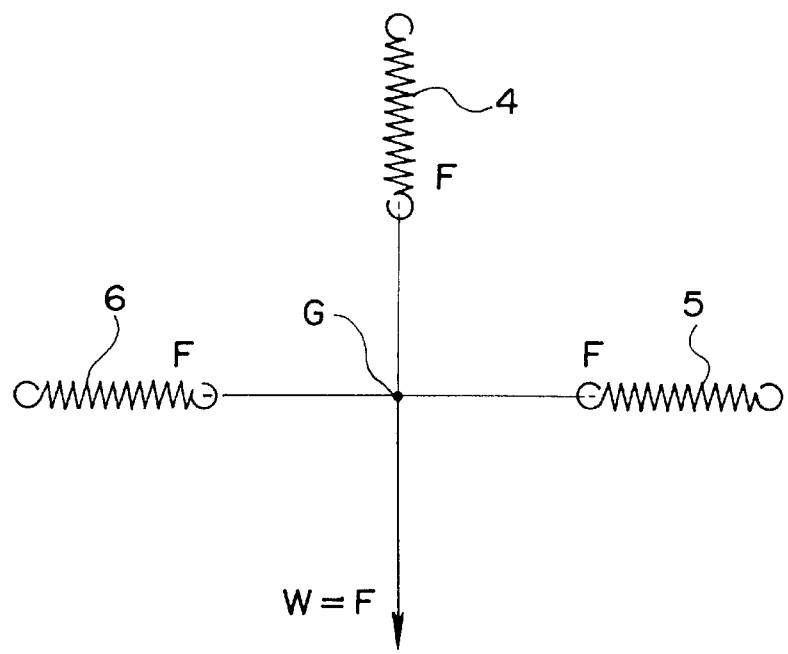
FIG. 6 is a side view showing the state of the supporting mechanism in a state where the disc player is inclined by 45°.
Figure 7:
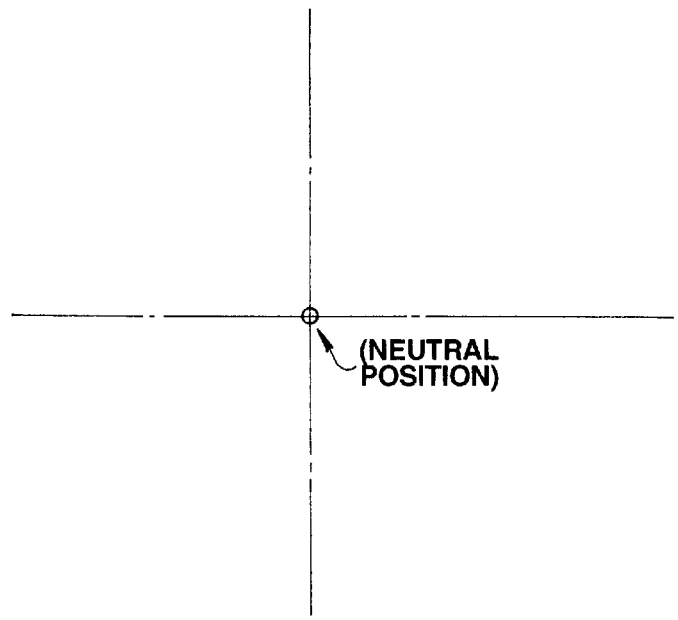
FIG. 7 is a vector diagram showing the distribution of the force of the supporting mechanism in a state where the disc player is inclined by 45°.

The supporting mechanism configured in this way has, for the vertical direction, the weight W of the recording and/or reproducing portion 2 and the elastic forces $F_1$, $F_2$, and $F_3$ of the respective springs 4, 6, and 5, that is, the weight W and the elastic force $F_1$ of the first spring 4, balanced so that in a position where the angle of inclination of the housing 1 is the angle of the middle point within the range of usable angle, that is, the housing 1 is inclined from the horizontal position by +45°, as shown in FIG. 6 and FIG. 7, the recording and/or reproducing portion 2 is located at the neutral position in the housing 1. Namely, when the recording and/or reproducing portion 2 is located at the neutral position in the housing 1, W becomes equal to $F_1$.

In the supporting mechanism, when the housing 1 is installed inclined by +45°, as shown in FIG. 6 and FIG. 7, for the horizontal direction, the elastic forces $F_1$, $F_2$, and $F_3$ of the springs 4, 6, and 5, that is, the elastic force $F_2$ of the second spring 6 and the elastic force $F_3$ of the third spring 5, are balanced with each other so that the recording and/or reproducing portion 2 is located at the neutral position of the housing 1.

In this way, the weight W of the recording and/or reproducing portion 2 and the elastic forces $F_1$, $F_2$, and $F_3$ of the springs 4, 6, and 5 are balanced with each other in the vertical direction and the horizontal direction, whereby the recording and/or reproducing portion 2 is held at the neutral position in the housing 1.

Here, the "neutral position" is the position where the recording and/or reproducing portion 2 becomes equally distant from the inner surface of the housing 1 in all directions. Namely, by supporting the recording and/or reproducing portion 2 at the neutral position, it will not strike the inner surface of the housing 1 and the distances of possible movement inside the housing 1 become equal in all directions.

Figure 5:
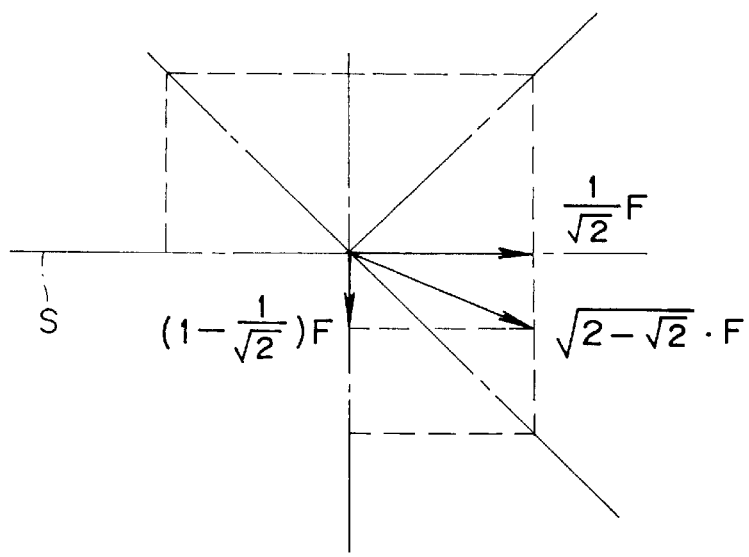
FIG. 5 is a vector diagram showing the distribution of force of the supporting mechanism when the disc player is in the horizontal state.
Figure 8:
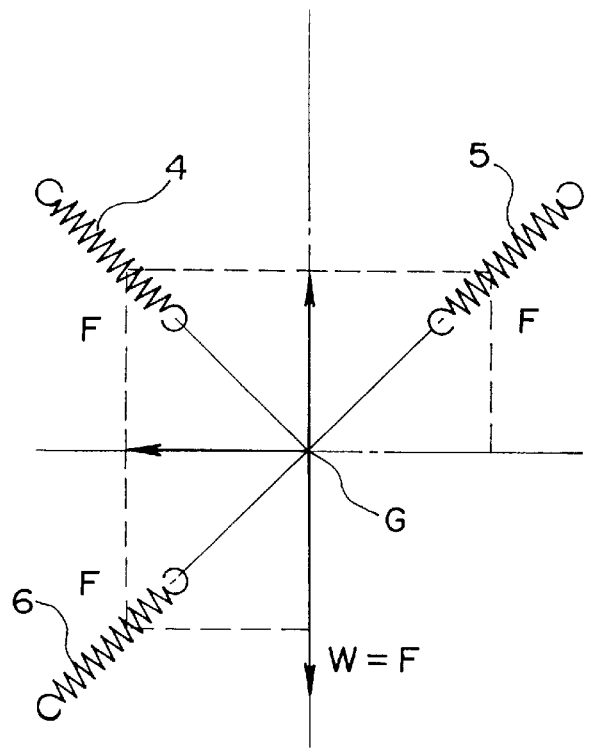
FIG. 8 is a side view showing the state of the supporting mechanism in a state where the disc player is inclined by 90°.
Figure 9:
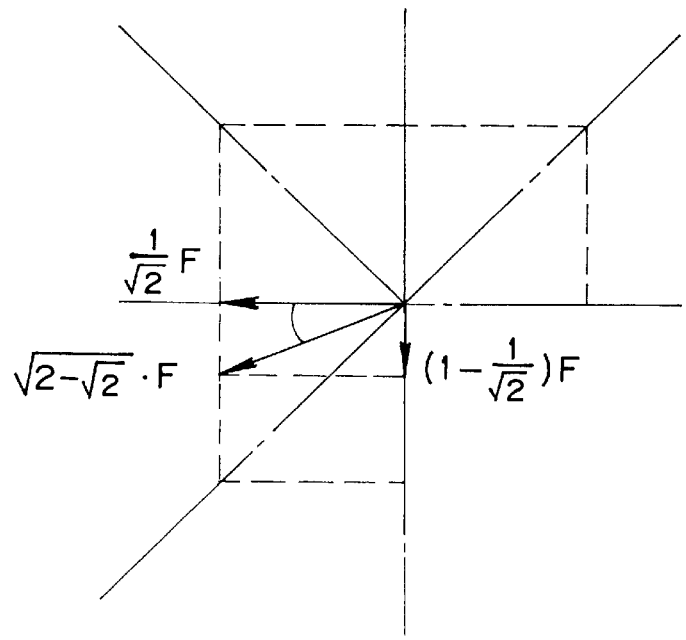
FIG. 9 is a vector diagram showing the distribution of the force of the supporting mechanism in a state where the disc player is inclined by 90°.

When the angle of inclination of the disposed housing 1 facing the horizontal direction is ±0°, as shown in FIG. 5, the resultant force of the weight W of the recording and/or reproducing portion 2 and the elastic forces $F_1$, $F_2$, and $F_3$ of the springs 4, 6, and 5 becomes the resultant force of $(1/\sqrt{2})F$ in the horizontal forward direction and $(1-(1/\sqrt{2}))F$ in the vertical downward direction, that is, becomes $(\sqrt{(2-\sqrt{2})})F$. Accordingly, the recording and/or reproducing portion 2 moves forward obliquely downward from the neutral position exactly by a distance in accordance with the resultant force $(\sqrt{(2-\sqrt{2})})F$ in the housing 1. Further, when the angle of inclination in the state where the housing 1 is installed facing the vertical direction, that is, the housing 1 is installed so that it stands vertically up as shown in FIG. 8, is +90°, as shown in FIG. 9, the resultant force of the weight W of the recording and/or reproducing portion 2 and the elastic forces $F_1$, $F_2$, and $F_3$ of the springs 4, 6, and 5 becomes the resultant force of $(1/\sqrt{2})F$ in the horizontal backward direction and $(1-(1/\sqrt{2}))F$ in the vertical downward direction, that is, becomes $(\sqrt{(2-\sqrt{2})})F$. Accordingly, the recording and/or reproducing portion 2 will move backward obliquely downward from the neutral position exactly by a distance in accordance with the resultant force $(\sqrt{(2-\sqrt{2})})F$ in the housing 1.

In this disc player, the strokes of the springs 4, 6, and 5 and the clearance or distance between the recording and/or reproducing portion 2 and the inner surface of the housing 1 are set so that the apparatus can be fully used even if the recording and/or reproducing portion 2 moves from the neutral position by a distance in accordance with the resultant force $(\sqrt{(2-\sqrt{2})})F$.

Figure 10:
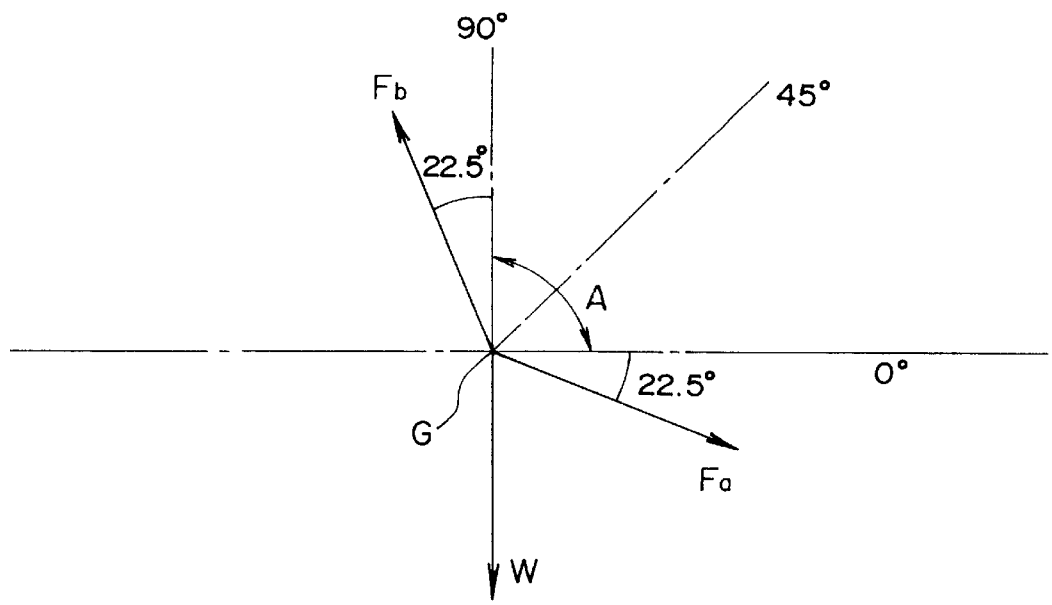
FIG. 10 is a vector diagram showing the principle of the supporting mechanism in the disc player.

The distance of movement in accordance with $(\sqrt{(2-\sqrt{2})})F$ can be reduced by making the spring constants of the springs 4, 6, and 5 larger. When considering this by dividing the resultant force F of the elastic forces $F_1$, $F_2$, and $F_3$ of the springs 4, 6, and 5 into two directions, as shown in FIG. 10, it can be divided to a first elastic force $Fa$ $(=W/\sqrt{(2-\sqrt{2})})F$ in the −22.5° direction and a second elastic force $Fb$ $W/\sqrt{(2-\sqrt{2})})$ in the +112.5° direction. These first and second elastic forces Fa and Fb become symmetrical relative to the angle (+45°) of the middle point of the range of usable angle indicated by an arrow A in FIG. 10.

Figure 11:
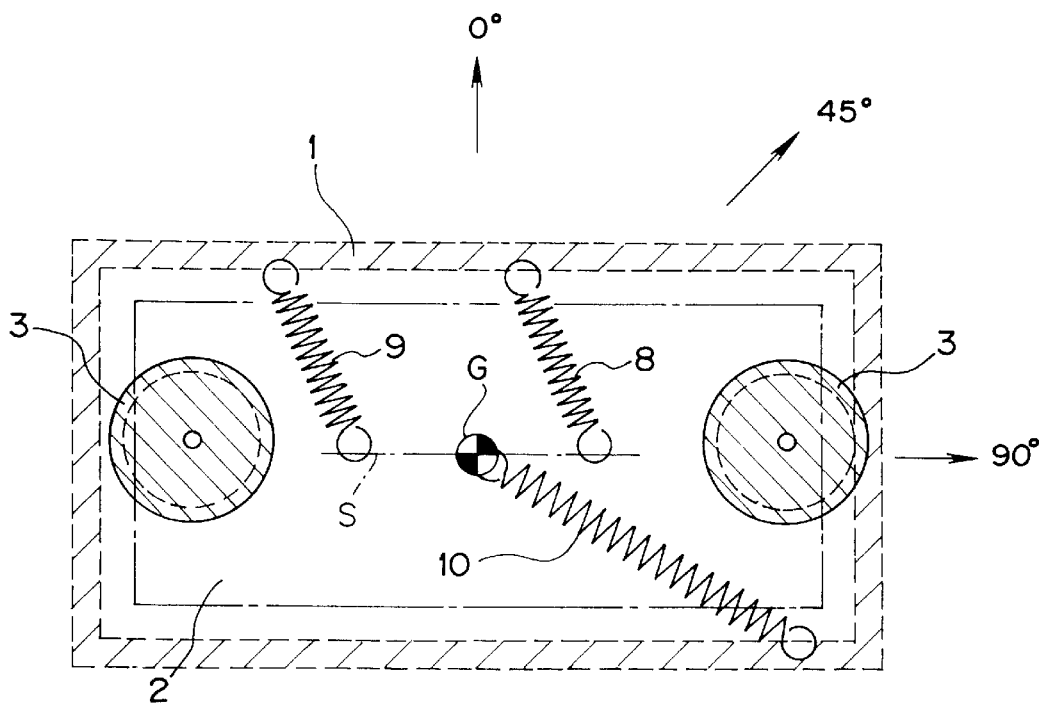
FIG. 11 is a side view of a disc player partially cut-away according to a second embodiment of the present invention.
Figure 12:
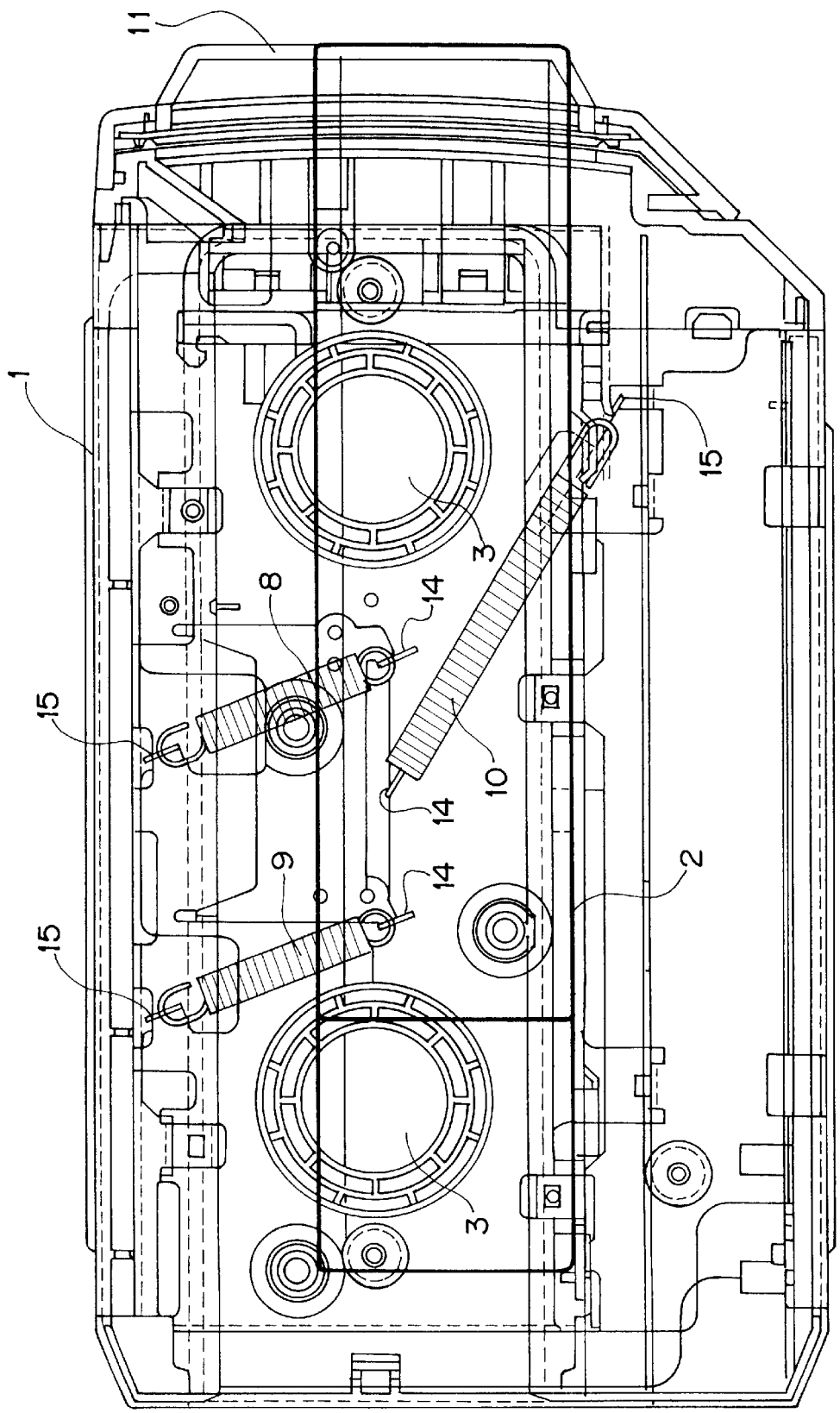
FIG. 12 is a perspective side view of the internal portion of the above disc player.
Figure 13:
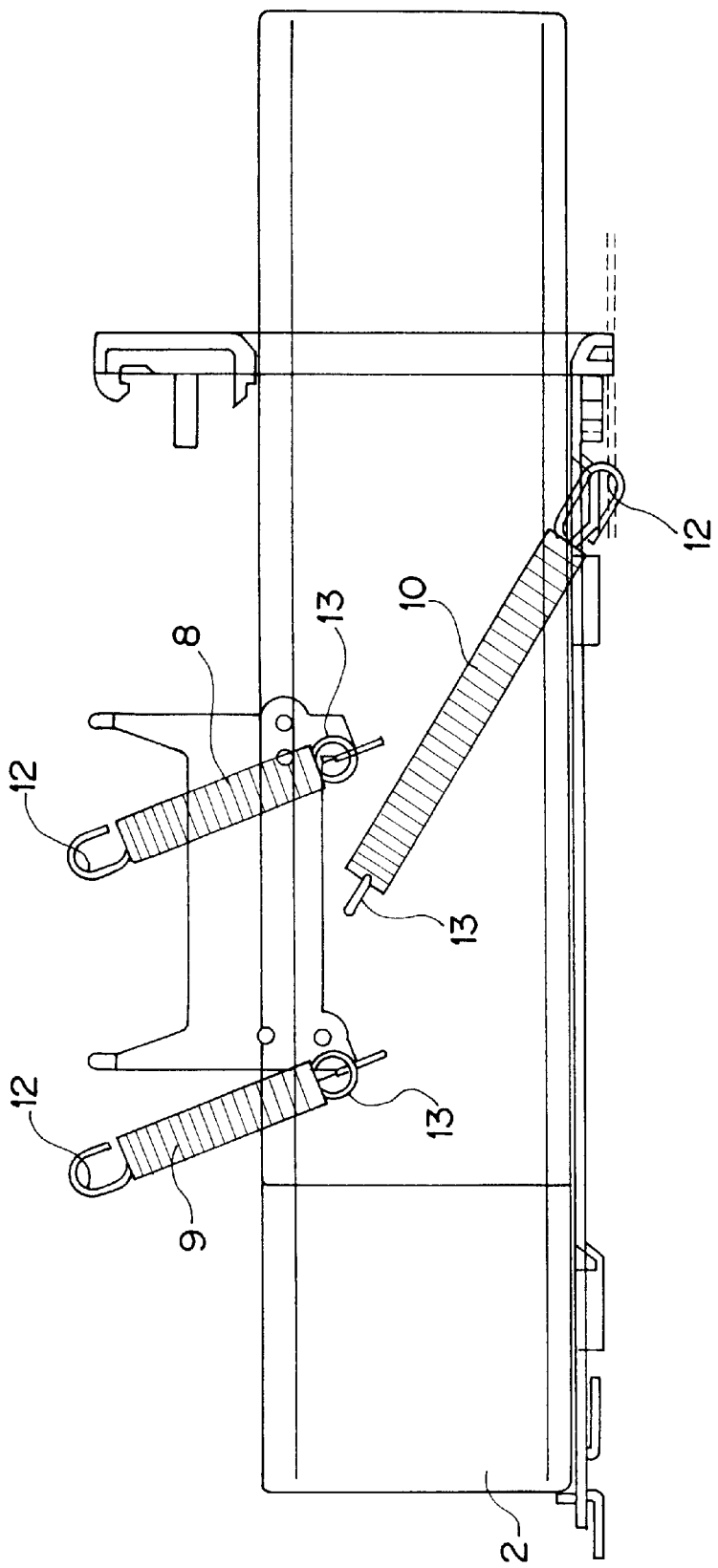
FIG. 13 is a side view of the main portions of the above disc player.

Next, an explanation will be made on a second embodiment of the present invention by using FIG. 11 and the subsequent figures. The pair of supporting mechanisms arranged on the two opposing sides of the recording and/or reproducing portion 2 according to the second embodiment, as shown in FIG. 11 to FIG. 13, make the range of usable angle of the disc player ±0° to +90° with respect to the horizontal direction similar to the first embodiment and can be configured by first to third springs 8, 9, and 10 comprised of tensile coil springs. Note that the same reference are given to portions the same as in the first embodiment.

In this second embodiment, the first spring 8 is located in the plane vertical to the horizontal pivot shaft passing through the center of gravity G of the recording and/or reproducing portion 2 and is arranged at a position facing upward at a slant at +112.5° as the angle from the S direction of the plane parallel to the horizontal plane. This first spring 8, as shown in FIG. 12, has the hook portion 13 formed on the end located at the pivot shaft side engaged with the engagement portion 13 of the recording and/or reproducing portion 2, and the hook portion 12 on the other end located on the side away from the pivot shaft engaged with the engagement portion 15 of the housing 1. As a result, the first spring 8 is tensed between the recording and/or reproducing portion 2 and the housing 1.

As shown in FIG. 11 and FIG. 12, the second spring 9 is located in the plane vertical to the horizontal pivot shaft passing through the center of gravity G of the recording and/or reproducing portion 2, is located at the rear at the opposite side to the first spring 8 from the pivot shaft, and is arranged at a position facing upward at a slant at +112.5° as the angle from the horizontal plane S. This second spring 9, as shown in FIG. 12 and FIG. 13, has the hook portion 13 formed on the end located on the pivot shaft side engaged with the engagement portion 13 of the recording and/or reproducing portion 2 and has the hook portion 12 on the other end located at the side apart from the pivot shaft engaged with the engagement portion 15 of the housing 1. As a result, the second spring 9 is tensed between the recording and/or reproducing portion 2 and the housing 1.

The third spring 10 is located in the plane vertical to the horizontal pivot shaft passing through the center of gravity G of the recording and/or reproducing portion 2 and is arranged at a position facing downward at a slant at −22.5° as the angle from the direction of plane S parallel to the horizontal plane. This third spring 10, as shown in FIG. 12 and FIG. 13, has the hook portion 13 formed on the end located on the pivot shaft side engaged with the engagement portion 13 of the recording and/or reproducing portion 2 and has the hook portion 12 on the other end located on the side away from the pivot shaft engaged with the engagement portion 15 of the housing 1. As a result, the third spring 10 is tensed between the recording and/or reproducing portion 2 and the housing 1.

The hook portions 12 and 13 provided at the end portions of the first, second, and third springs 8, 9, and 10 are formed by bending the wire materials constituting these springs to a ring-like state. Also, the engagement portions 14 and 15 provided on the housing 1 with which these hook portions 12 and 13 are engaged are formed as hooks so that they can prevent easy detachment when the hook portions 12 and 13 are engaged.

Note that, in the disc player of the second embodiment shown in FIG. 12 as well, a plurality of dampers 3 are arranged between the recording and/or reproducing portion 2 and the housing 1. On the front surface of the housing 1, a lid 11 for opening and closing the opening for mounting and ejecting the disc to and from the interior of the housing 1 is provided.

In the disc player shown in FIG. 12, the distance between the dampers 3 is set long. Accordingly, the recording and/or reproducing portion 2 is not affected much by the rotation moment caused by the first, second, and third springs 8, 9, and 10.

In this disc player of second embodiment, further, the first, second, and third springs 8, 9, and 10 are arranged at positions offset from the line intersecting the horizontal pivot shaft passing through the center of gravity G of the recording and/or reproducing portion 2, and accordingly the size of the entire supporting mechanism can be reduced.

Also, in the disc player of the second embodiment, the elastic forces of the springs 8, 9, and 10 and the weight W of the recording and/or reproducing portion 2 are balanced so that the recording and/or reproducing portion 2 is located at the neutral position of the housing 1 when the angle of inclination of the housing 1 is the angle of the middle point of the range of usable angle, that is, it is disposed at the position inclined from the horizontal position by +45°. As a result, the recording and/or reproducing portion 2 is supported at the neutral position in the housing 1. Then, when the housing 1 is horizontally installed, that is, when the angle of inclination is ±0°, the recording and/or reproducing portion 2 moves forward downward at a slant from the neutral position exactly by a distance in accordance with the resultant force of the weight W of the recording and/or reproducing portion 2 and the elastic forces of the springs 8, 9, and 10. Further, in a state where the housing 1 faces the vertical direction, that is, the angle of inclination when the housing 1 is installed so as to vertically stand up is +90°, the recording and/or reproducing portion 2 will move backward downward at a slant from the neutral position exactly by a distance in accordance with the resultant force of the weight W of the recording and/or reproducing portion 2 and the elastic forces of the springs 8, 9, and 10.

In this disc player, the strokes of the springs 8, 9, and 10 of the supporting mechanism and the clearance or distance between the recording and/or reproducing portion 2 and the inner surface of the housing 1 are set so that the recording and/or reproducing portion 2 can be fully used even if the recording and/or reproducing portion 2 moves from the neutral position by a distance in accordance with the resultant force of the springs 8, 9, and 10. Also in this embodiment, similar to the first embodiment, the distance of movement of the recording and/or reproducing portion 2 caused by application of vibration or shock to the housing 1 can be made smaller by making the spring constants of the springs 8, 9, and 10 forming the supporting mechanism larger. Namely, by making the spring constants of the springs 8, 9, and 10 larger, when vibration and shock are applied to the housing 1, the amount of extension of the springs 8, 9, and 10 caused by the vibration and shock becomes smaller. For this reason, the springs 8, 9, and 10 are used in a state where they are not largely extended from the length of the no-load state. If a large vibration and shock are applied to the housing 1, however, when any of the springs 8, 9, and 10 largely extends, the springs 8, 9, and 10 which are arranged at positions opposite to the extending springs 8, 9, and 10 from the recording and/or reproducing portion 2 are easily compressed to the free length, that is, the length of the no-load state, or less. Namely, there exists a case where the distance between the engagement portion 14 of the recording and/or reproducing portion 2 and the engagement portion 15 of the housing 1 becomes shorter than the length of the free length, that is, the length in the no-load state where the springs 8, 9, and 10 are not extended. When the distance between the engagement portion 14 of the recording and/or reproducing portion 2 and the engagement portion 15 of the housing 1 becomes shorter than the length in the no-load state where the springs 8, 9, and 10 are not extended, there would be a chance that the hook portions 12 of these springs 8, 9, and 10 would detach from the engagement portions 15. In this way, when the distance between the engagement portions 14 and 15 becomes shorter than the length when the springs 8, 9, and 10 are in the no-load state, that is, when the hook portions 12 are not detached from the engagement portions 15 when a force in the compression direction is applied to the springs 8, 9, and 10, these springs 8, 9, and 10 would act as rigid bodies and restrict free movement of the recording and/or reproducing portion 2. Then, they would directly apply shock to the recording and/or reproducing portion 2.

Figure 14:
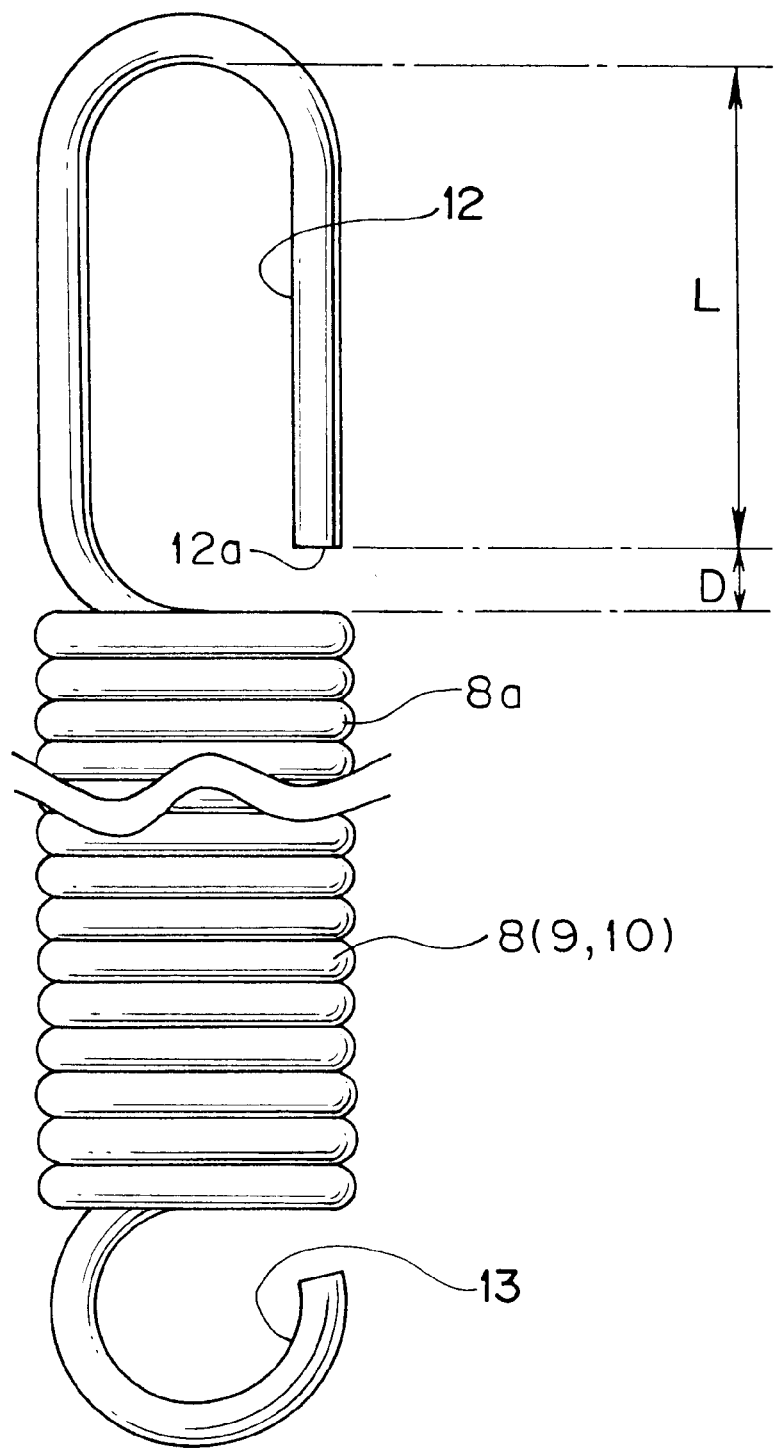
FIG. 14 is a side view of the shape of a spring to form the supporting mechanism of the above disc player.
Figure 15:
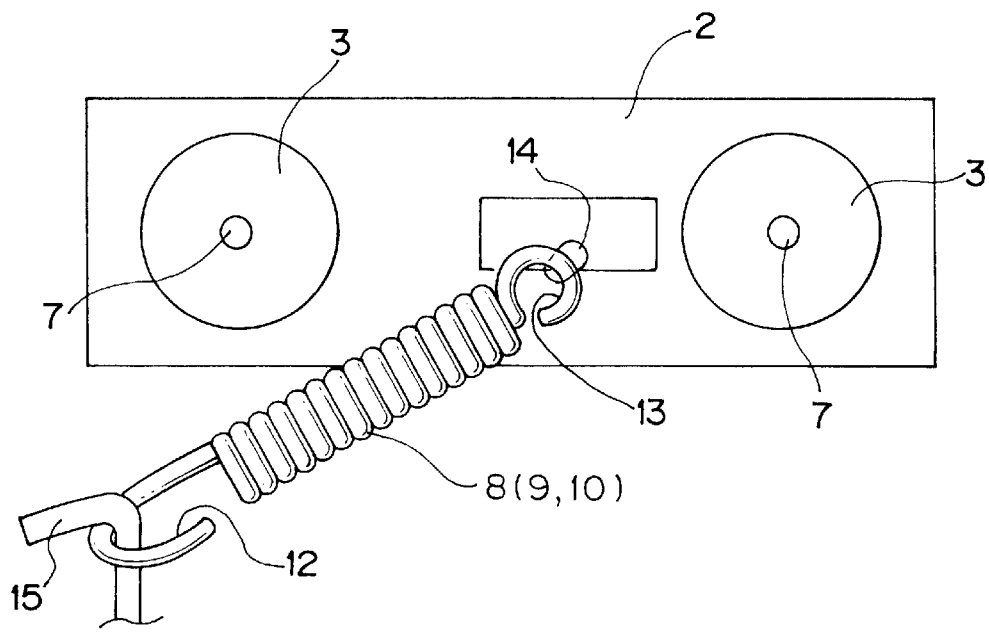
FIG. 15 is a side view schematically showing the state of a spring when the above disc player is in a steady state.

Therefore, in order to prevent the springs 8, 9, and 10 from acting as rigid bodies even in a case where they are compressed to a length shorter than the distance between the engagement portion 14 of the recording and/or reproducing portion 2 and the engagement portion 15 of the housing 1, at least the length in the direction indicated by an arrow L in FIG. 14, that is, the length of the springs 8, 9, and 10 in the direction of extension of the hook portion 12 on one end, is made longer. In this way, by making the length of at least one hook portion 12 longer, when the springs 8, 9, and 10 are compressed to a length which is shorter than the distance between the engagement portion 14 of the recording and/or reproducing portion 2 and the engagement portion 15 of the housing 1, the transfer of the vibration and shock to the recording and/or reproducing portion 2 via these springs 8, 9, and 10 can be restricted. Note that, the length of the hook portion 12 is appropriately set in accordance with the magnitude of the vibration and shock applied to the housing 1 and the spring constants of the springs 8, 9, and 10. Further, when the springs 8, 9, and 10 are compressed to a length which is shorter than the distance between the engagement portion 14 of the recording and/or reproducing portion 2 and the engagement portion 15 of the housing 1, the interval D between the tips of the hook portions 12 and the ends of the coil portions 8a of the springs 8, 9, and 10 is made smaller than the diameter of the engagement portion 15 so that the hook portions 12 do not detach from the engagement portions 15 of the housing 1. By forming the hook portions 12 in this way, when the recording and/or reproducing portion 2 moves from the neutral position in the housing 1 inside the housing 1 as shown in FIG. 15 and is moved in the direction largely extending any of the springs 8, 9, and 10 and compressing the other springs 8, 9, and 10 located on the side opposite to these extended springs 8, 9, and 10 to a length shorter than the length in the no-load state as shown in FIG. 16, detachment from the engagement portion 15 of the housing 1 is prevented even if it moves by only an amount of the length of the hook portion 12.

Figure 16:
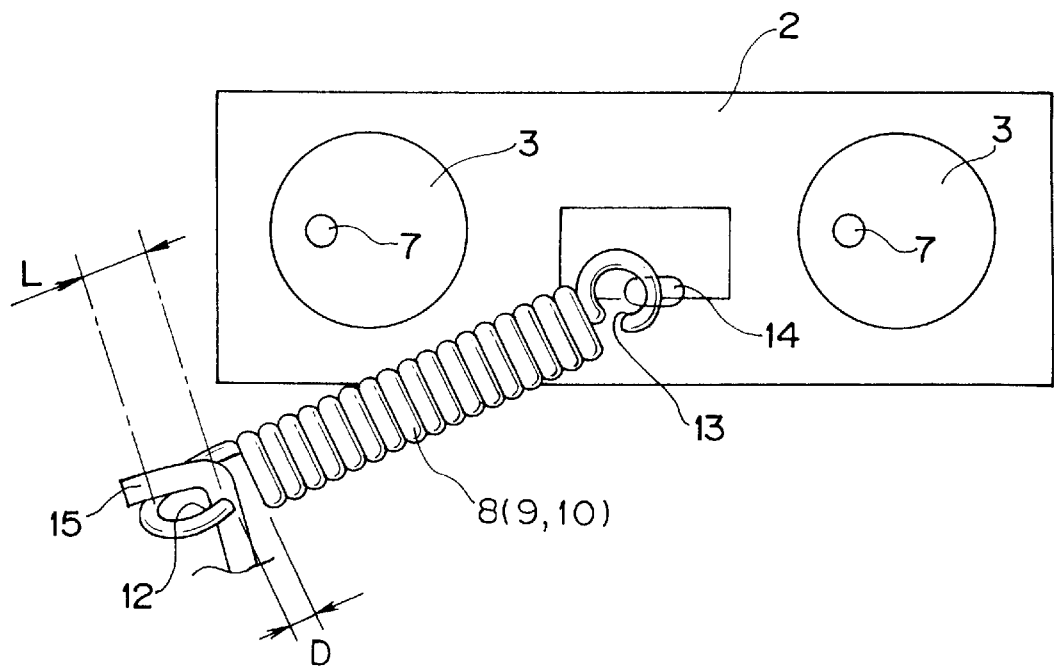
FIG. 16 is a side view schematically showing the state of the spring in a state where shock is applied to the above disc player.

When the recording and/or reproducing portion 2 is moved in the direction compressing any of the springs 8, 9, and 10 to a length shorter than that in the no-load state as shown in FIG. 16 and the hook portions 12 are moved away from the engagement portions 15, then the recording and/or reproducing portion 2 moves in a direction returning to its neutral position again, there is a chance that the hook portions 12 and the engagement portions 15 will strike each other and a shock will be applied to the recording and/or reproducing portion 2. As a result, vibration will be applied to the recording and/or reproducing portion 2, the scanning of the track of the optical disc by the optical pick-up device will be interrupted, or another track will be scanned, and therefore there is a chance that it will become impossible to perform continuous recording and/or reproduction of the information signal.

In order to prevent the occurrence of the shock due to such striking of a hook portion 12 and an engagement portion 15, it is desirable that a buffer member made of a material having a shock absorbing property such as rubber be arranged at the portion where the hook portion 12 abuts against the engagement portion 15. This buffer member may be arranged at both or either of the hook portion 12 and the engagement portion 15.

Figure 17:
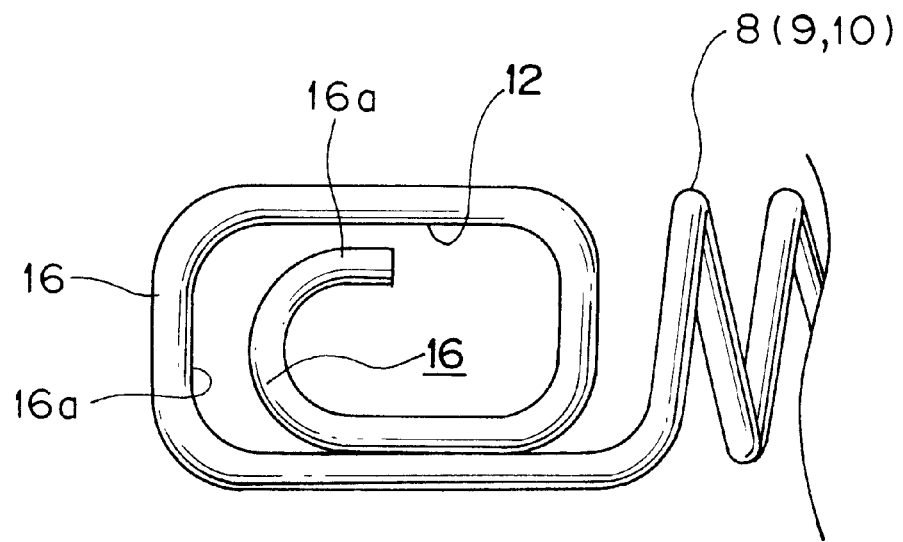
FIG. 17 is an enlarged side view of main parts showing another example of a spring to form the supporting mechanism.

Further, in place of providing such a buffer member, as shown in FIG. 17, a buffer portion 16 may be provided by bending the wire materials to form the springs 8, 9, and 10 and the hook portions 12 so as to be wound two times inside the hook portions 12. At this time, a space 16c to allow elastic displacement on the tip portion 12a is provided between the tip portion 16a and the base portion 16b of the hook portion 12. A buffer portion 16 having such a space 16c allows the elastic displacement of the tip portion 16a and the absorption of shock. These springs can also be used in the first embodiment described above.

Figure 18:
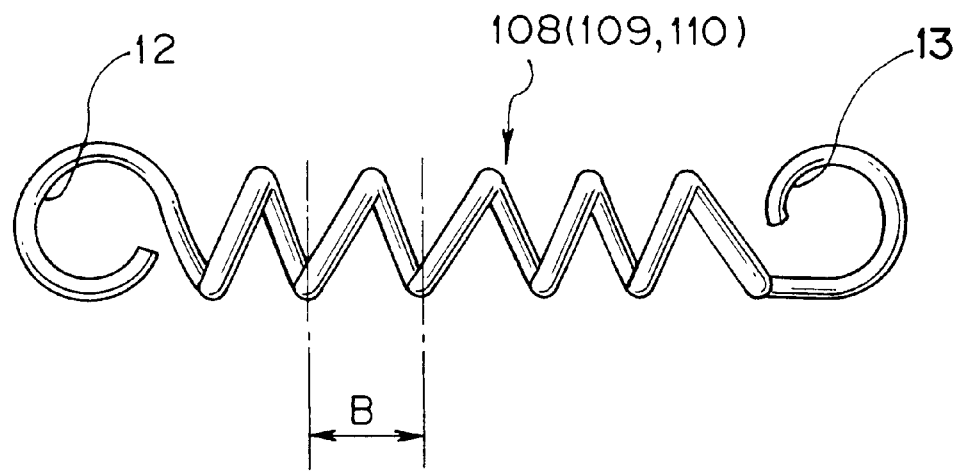
FIG. 18 is an enlarged side view of still another example of a spring to form the supporting mechanism.

Further, the springs 108, 109, and 110 are wound so as to have a constant clearance B without close contact with the coil portion 8a as shown in FIG. 18, thereby to allow the elastic displacement in the compression direction. By using such springs 108, 109, and 110, when the distance between the engagement portion 14 of the recording and/or reproducing portion 2 and the engagement portion 15 of the housing 1 becomes equal to or less than the length of the springs 108, 109, and 110 in the no-load state, the springs may be compressed while being resiliently displaced and exhibit an elastic absorption function. In this case, the hook portions 113 provided at the two end portions of the springs 108, 109, and 110 are formed in a ring-like state so that the interval between the tip sides becomes less than the diameter of the engagement portions 14 and 15 as shown in FIG. 18 so as to prevent the detachment from the engagement portions 14 and 15.

As mentioned above, in the disc player according to the present invention, the supporting mechanism having a plurality of springs for supporting the recording and/or reproducing portion arranged in the housing supports the recording and/or reproducing portion at the neutral position in the housing by balancing the weight of the recording and/or reproducing portion and the elastic forces of the springs in the vertical direction and balancing the elastic forces of the springs with each other in the horizontal direction when the housing is at the position of the middle point of the range of usable angle of this housing and the recording and/or reproducing portion is located at the neutral position in the housing.

Acordingly, in this disc player, the supporting mechanism can support this recording and/or reproducing portion while keeping the distance of displacement of the recording and/or reproducing portion sufficiently small in the entire range of the usable angle.

In the above embodiments, the explanation was made by referring to a disc player to be installed in the passenger compartment of an automobile as an example, but the position of installation is not limited to the interior of a passenger compartment. Of course the invention can be similarly applied to a disc player to be installed in the trunk of the automobile. Further, the explanation was made by referring to an example where the present invention was applied to a recording and/or reproducing apparatus using a disc as the recording medium, but the application is not limited to a recording and/or reproducing apparatus using a disc-like recording medium and can be applied also to a recording and/or reproducing apparatus using the tape-like recording medium such as at magnetic tape and similar advantages can be obtained. Namely, a variety of modifications of the present invention are possible within a range of the intention of the above embodiments.

What is claimed is:

1. A recording and/or reproducing apparatus comprising:

a housing arranged at an angle of inclination between a horizontal position and a vertical position;

recording and/or reproducing means for performing recording and/or reproduction of a recording medium when the recording medium is accommodated in said housing and having first and second ends; and elastic supporting means attached between said housing and said recording and/or reproducing means at said first and second ends for supporting said recording and/or reproducing means so that said recording and/or reproducing means is movably supported by an elastic supporting force in said housing, wherein said elastic supporting means supports said recording and/or reproducing means so that the weight of said recording and/or reproducing means and said elastic supporting force are balanced when said housing is arranged at said angle of inclination between said horizontal and said vertical positions, and wherein said recording and/or reproducing means is movable in all directions a substantially equal distance relative to said housing when said housing is arranged at an intermediate position between said horizontal position and said vertical position, wherein said elastic supporting means includes a first set of three springs arranged at said first end of said recording and/or reproducing means and a second set of three springs arranged at said second end of said recording and/or reproducing means, and wherein one end of each of said springs is attached to said recording and/or reproducing means and another end of each of said springs is attached to said housing, wherein said first and second sets of three springs are arranged so that a direction of the respective elastic supporting force in an axial direction of each of said springs is in a direction extending through the point corresponding to the center of gravity of said recording and/or reproducing means.

2. The recording and/or reproducing apparatus according to claim 1, wherein each of said first and second sets of three springs comprise first, second, and third springs arranged so that there is a 90° angle between said first and second springs, a 90° angle between said second and third springs, and a 180° angle between said third and first springs.

3. The recording and/or reproducing apparatus according to claim 2, wherein one end of each of said springs is provided with a hook portion, and wherein said hook portion has a length in the direction parallel to said direction of said elastic supporting force that is longer than a length in the direction perpendicular to said direction of said elastic supporting force.

4. The recording and/or reproducing apparatus according to claim 3, wherein said hook portion is provided with a buffer portion.

5. The recording and/or reproducing apparatus according to claim 1, further comprising buffer means arranged between said housing and said recording and/or reproducing means.

* * * * *